Patented June 19, 1945

2,378,859

UNITED STATES PATENT OFFICE 2,378,859

SPLITTING-OFF OF HYDROGEN HALIDE FROM HALOGENATED HYDROCARBONS

Martin Mugdan, Richmond, and Derek Harold Richard Barton, London, England, assignors to The Distillers Company Limited, Edinburgh, Scotland, a British company No Drawing. Application December 31, 1942, Serial No. 470,849. In Great Britain August 8, 1941

11 Claims. (Cl. 260—654)

This invention is for improvements in or relating to the splitting-off of hydrogen chloride from chlorinated hydrocarbons.

In the splitting-off of hydrogen chloride from chlorinated hydrocarbons, many catalysts, particularly metal chlorides, have been proposed and are in fact in use, the vapour of the compound being passed over the catalyst at an elevated temperature. For large scale commercial use these processes present the same disadvantages as other heterogeneous catalytic reactions principally the low heat conductivity of the catalyst and its restricted useful life.

We have found, that the dissociation of many aliphatic chlorinated hydrocarbons can be effected in an unexpectedly simple and easy way and according to the invention there is provided a process for splitting-off hydrogen chloride from an aliphatic chlorinated hydrocarbon containing 2 or 3 carbon atoms in the molecule and containing the group —CHCl—CHCl— which comprises in the vapour phase carrying out the reaction at an elevated temperature in the presence of a small amount of chlorine or bromine or a compound which yields chlorine or bromine at an elevated temperature, such as for example sulfuryl chloride, thionyl chloride, hexachloroethane and the like. In some cases the temperature at which hydrogen chloride is split off is reduced by several hundred degrees centigrade by the process of the invention as compared with thermal decomposition processes in which no halogen is used as catalyst. The process does not appear to be a true catalysis, for the halogen, or the greater part thereof disappears during the reaction. It is probable that the halogen acts by starting chain-reactions. In carrying out the process of the present invention, care has to be taken that the halogen and/or the halogen-yielding compounds are not destroyed before the temperature of reaction is reached. In some cases therefore they must be added to the vapour immediately before the entrance of the vapour into the reaction chamber. In other cases, the halogen or halogen-yielding compound can simply be dissolved in the chlorinated hydrocarbon.

The following examples illustrate the invention:

*Example I.*—Ethylene dichloride was mixed with ½% by weight of chlorine. 38 gr. per hour were dropped in a uniform stream into the upper end of a tube of a heat resistant glass of 11 mm. diameter, 800 mm. length, somewhat inclined and heated over a length of 600 mm. to the temperature indicated below. The unreacted ethylene dichloride was condensed out of the issuing gases, which were then washed with water to remove hydrogen chloride, dried with calcium chloride, and the vinyl chloride which is the desired end product was then condensed at low temperature. The excess ethylene dichloride was gently refluxed to prevent vinyl chloride becoming or remaining dissolved therein. At 300° C. about 30% and at 350° C. about 50% by weight of the ethylene dichloride was converted into vinyl chloride, whilst at 370° C. about 70% by weight of vinyl chloride was obtained. Without the addition of chlorine the conversion at 400° C. was only 2% by weight and even at 500° C. not more than 30% by weight could be obtained. The quantity of the chlorine added could be lowered to 0.05% by weight without much decrease in the yield. No by-products other than a trace of acetylene were formed. Bromine also proved effective in promoting the reaction.

*Example II.*—Symmetrical tetrachloroethane was mixed with ½% by weight of chlorine and 30 gr. per hour of this mixture were dropped into a tube similar to that used in Example I. The products thus obtained were introduced into cooled water and condensed therein. At 300° C. 50% by weight were transformed into trichloroethylene, at 350° C. 75%, and at 400° C. 95% by weight was obtained. No by-products were produced. Without the addition of chlorine the conversion was at 300° C. nil and at 400° C. only 65% by weight.

*Example III.*—1-1-2-trichloroethane, containing 0.5% by weight chlorine were treated in the same way as described in Example I. With an input of 30 gr. per hour the conversion was: at 350° C. 45% and at 400° C. 85% by weight. Without chlorine at 350° C. 1.5% and at 400° C. 4% by weight only were obtained. The product was a mixture of the asymmetrical and the symmetrical dichloroethylenes, in which the asymmetric compound largely predominates. No other products were formed.

*Example IV.*—Ethylene dichloride was mixed with 0.5% by weight of sulfuryl chloride and heated in the apparatus described in Example I. At 350° C. a 50% conversion was obtained, i. e. the same conversion rate as with chlorine. The input was 40 gr. per hour.

*Example V.*—Ethylene dichloride mixed with 0.5% by weight of hexachloroethane, gave with an input of 40 gr. per hour at 350° C. 3.8% at 400° C. 12% and at 450° C. 46% by weight of vinyl chloride.

*Example VI.*—Propylene dichloride vapour was passed through the tube at the rate of 26 gms. per hour, 3% by weight of chlorine being introduced simultaneously. At 380° C. 16% by weight of the propylene dichloride was converted into a mixture of monochlorpropylenes, whilst at 430° C. 21% were converted. In the absence of chlorine, no conversion was obtained at 380° C., and only 1% of the propylene dichloride was converted at 430° C.

The velocity of reaction is much influenced by small quantities of impurities, as is known for many other chain reactions; the yield obtained from different batches of raw materials may therefore vary somewhat under identical conditions of reaction. However, in every case, the addition of chlorine or bromine had a beneficial effect. Alcohols, ethylene oxide and hydrocarbons have proved especially harmful in this process but acetic acid, on the other hand, has been found to have little or no adverse influence on the reaction. It may therefore be necessary to purify the materials used in order to attain the best results. In the experiments recorded above in the examples the starting materials were carefully freed from impurities by fractionation and in some cases by a pretreatment with concentrated sulphuric acid or with alkali or with both in succession followed by washing with water. The ethylene dichloride used in Example I was obtained by purifying a commercial product made from alcohol via ethylene. The crude product, mixed with 0.5% by weight of chloride, gave at 500° C. a 16% by weight conversion, whilst without the addition of chlorine the yield was only 4%. The effect of the chlorine on the yield is evident here, but the purified material reacts more rapidly at a temperature which is lower by 200° C. Similarly, with symmetrical tetrachloroethane the commercial product gives a 50% by weight conversion at 350° C. with chlorine, whilst without chlorine no reaction at all takes place at this temperature. As shown in Example II the pure product gives this yield at 300° C.

It has been found that small amounts of oxygen (as little as 3 mols. per cent of the chlorine or bromine), which may be absorbed from the air by the reaction materials or be added thereto, exert a beneficial influence on the reaction, leading to somewhat higher conversion figures. The materials used in Examples I to VI probably contain such traces of oxygen as no precautions were taken rigidly to exclude oxygen from the reaction.

The following further examples illustrate the effect of oxygen on the reaction:

*Example VII.*—54 gms. per hour of pure ethylene dichloride, previously freed from dissolved oxygen by boiling, were passed, in vapour form, through a tube of heat resistant glass of 11 mm. internal diameter which was heated to 350° C. over a length of 600 mm. Simultaneously 0.5% (by weight) of chlorine was introduced into the tube. The latter was taken from a cylinder with a low content of chlorine, so that little or no oxygen would be present in the chlorine. The conversion of ethylene dichloride into vinyl chloride varied between 17% and 25% of the ethylene chloride introduced. If now 15 ccs. of air (equivalent to 3 ccs. of oxygen) were added to the chlorine per hour, the conversion of ethylene dichloride increased to 36 to 48%. By increasing the amount of oxygen added to 30 ccs. per hour, more than 50% of the ethylene dichloride was converted.

*Example VIII.*—32 gms. of symmetrical tetrachlorethane, freed from air by boiling, were passed per hour through the same tube together with 1% by weight of chlorine. 11% of the tetrachlorethane were decomposed at 350° C. to trichlorethylene. By adding 6 ccs. of oxygen per hour, the decomposition increased to 50%.

Packing the reaction tube with glass scraps decreases the reaction velocity considerably, as is the case in other chain reactions.

As materials for the construction of the reaction chamber, alloys rich in nickel have proved especially useful. By reason of the low reaction temperature which can be used with some chlorinated hydrocarbons in this process alloys rich in iron and iron itself may even be used.

What we claim is:

1. A process for the manufacture of chlorinated unsaturated hydrocarbons by the splitting-off of one molecule of hydrogen chloride from a molecule of a chlorinated hydrocarbon containing at least 2 and not more than 3 carbon atoms in the molecule and including the grouping

which comprises carrying out the reaction in the vapour phase at an elevated temperature in the presence of a small amount of a member of the group consisting of chlorine, bromine, compounds which yield chlorine at an elevated temperature, and compounds which yield bromine at an elevated temperature.

2. A process according to claim 1 wherein the said member is added to the chlorinated hydrocarbon vapour immediately before entry of the reactants into the reaction zone.

3. A process according to claim 1 wherein the halogen is present in an amount of about 0.5 to 3% by weight of the chlorinated hydrocarbon.

4. A process according to claim 1 wherein the halogen is added to the chlorinated hydrocarbon vapour immediately before entry of the reactants into the reaction zone and in an amount of about 0.5 to 3% by weight of the chlorinated hydrocarbon.

5. A process according to claim 1 wherein the chlorinated hydrocarbon is purified prior to the reaction.

6. A process according to claim 1 wherein a small amount of oxygen is added to the reaction mixture.

7. A process for the manufacture of chlorinated unsaturated hydrocarbons by the splitting-off of one molecule of hydrogen chloride from a molecule of a chlorinated hydrocarbon containing at least 2 and not more than 3 carbon atoms in the molecule and including the grouping

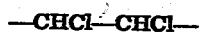

which comprises carrying out the reaction in the vapour phase at an elevated temperature in the presence of a small amount of a member of the group consisting of chlorine, bromine, compounds which yield chlorine at an elevated temperature, and compounds which yield bromine at an elevated temperature, said elevated temperature being considerably below the temperature at which an equivalent dehydrochlorination is possible in the absence of the said member.

8. A process according to claim 1 wherein the chlorinated hydrocarbon is ethylene dichloride and the resultant product is vinyl chloride.

9. A process according to claim 1 wherein the chlorinated hydrocarbon is symmetrical tetrachloroethane and the resultant product is trichloroethylene.

10. A process according to claim 1 wherein the chlorinated hydrocarbon is 1,1,2-trichloroethane and the resultant product is a mixture of asymmetrical and symmetrical dichloroethylenes.

11. A process according to claim 1 wherein the chlorinated hydrocarbon is propylene dichloride and the resultant product is a mixture of monochloropropylenes.

MARTIN MUGDAN.
DEREK HAROLD RICHARD BARTON.